United States Patent Office 3,840,607
Patented Oct. 8, 1974

3,840,607
PROCESS FOR SEPARATING HALOGENATED HYDROCARBONS BY LIQUID-LIQUID EXTRACTION
Donald O. Hanson, Bartlesville, Okla., assignor to Phillips Petroleum Company, Bartlesville, Okla.
No Drawing. Filed May 10, 1971, Ser. No. 141,966
Int. Cl. C07c *19/08*
U.S. Cl. 260—653                            2 Claims

ABSTRACT OF THE DISCLOSURE

A process for separating 1,1,2-trichlorotrifluoroethane from a first liquid mixture 1,1,2-trichlorotrifluoroethane and 1,2-dichloro-1,1-difluoroethane by contacting said first liquid mixture with a liquid sulfolane being at least partially immiscible with said first mixture at the temperature of contacting to form an extract phase containing enriched 1,2-dichloro-1,1-difluoroethane and a raffinate phase and separating said phases.

---

This invention relates to the separation of halogenated hydrocarbons of a first liquid mixture and, more particularly, to a process for separating 1,1,2-trichlorotrifluoroethane from a first liquid mixture of 1,1,2-trichlorotrifluoroethane and 1,2-dichloro-1,1-difluoroethane.

In order to simplify the description of this process, 1,1,2-trichlorotrifluoroethane is hereafter referred to as 113 and 1,2-dichloro-1,1-difluoroethane is hereafter referred to as 132*b*.

Various hydrocarbon processes known in the art produce liquid mixtures of 113 and 132*b* as well as other halogenated hydrocarbons. It then becomes necessary to separate the halogenated hydrocarbons from each other for use as pure chemicals or for further processing. An example source of the 113-132*b* first liquid mixture is found as a product of the electrochemical fluorination of ethylene dichloride. The process of the electrochemical fluorination of ethylene dichloride is known in the art and is not a part of this application and it should be understood that the halogenated hydrocarbon separation process of this invention can be utilized without regard to the process by which the hydrogenated hydrocarbons were mixed to form the first liquid mixture.

In their separated high-purity state, the constituents of the first mixture have boiling points and relative volatilities at atmospheric pressure as follows:

| Constituent | Boiling point, °C. | Relative volatility, 113/132*b* |
|---|---|---|
| 113 | 47.6 | 1.02 |
| 132*b* | 46.8 | |

The above tabulation indicates that it is next to impossible to separate 113 and 132*b* by ordinary distillation because of the close boiling points and attendant low value of relative volatility. Value of the relative volatility must generally be 1.1 or higher before a separation by ordinary distillation is effective. When the relative volatility is much less than about 1.1, other methods of separation are sought. Liquid-liquid extraction is commonly used to separate mixtures that cannot be effectively separated by ordinary distillation. Liquid-liquid extraction here requires the addition of an extraneous liquid to the liquid mixture to be separated and requires that said extraneous liquid be at least partially immiscible with the liquid mixture so that two liquid phases are formed: a solvent-rich phase and a raffinate rich phase. An additional requirement is that the extraneous liquid (selective solvent) dissolve more of one of the components to be separated than the other. In other words, the solvent phase must be richer in one component than the raffinate phase. To determine if certain liquids are suitable as selective solvents, a candidate solvent is mixed with the mixture to be separated, the two phases separated and analyzed. Distribution coefficients and solvent selectivities, sometimes called separation factors, which for liquid-liquid systems is equivalent to relative volatility in vapor-liquid systems, are then calculated from the component concentrations in the two liquid phases. The method of determining liquid-liquid equilibria to illustrate the feasibility of a liquid-liquid extraction process is well known in the art and explained in detail in Perry's Chemical Engineering Handbook.

To illustrate the effectiveness of sulfolane as a selective solvent for the liquid-liquid separation of 113 and 132*b*, a first mixture of 113 and 132*b* which also contained small amounts of 114, i.e., 1,2-dichlorotetrafluoroethane, was equilibrated with sulfolane at room temperature. The resulting two liquid phases were separated and analyzed with the following results:

| Sulfolane-rich phase | | Hydrocarbon-rich phase | | | |
|---|---|---|---|---|---|
| Component | Concentration, mole fraction | Component | Concentration, mole fraction | Distribution coefficient, K | Separation factor, 132*b*/113 |
| 114 | 0.008 | 114 | 0.013 | 0.6 | |
| 113 | 0.413 | 113 | 0.650 | 0.635 | |
| 132*b* | 0.166 | 132*b* | 0.217 | 0.765 | 1.2 |
| Sulfolane | 0.413 | Sulfolane | 0.120 | | |

The distribution coefficients were obtained by dividing the concentration of a component in the solvent-rich phase by the concentration of the same component in the hydrocarbon-rich phase. For example, K for 113 equals 0.413/0.650=0.635. The separation factor for sulfolane in separating 113 and 132*b* was obtained by dividing K for 132*b* by K for 113 or 0.765/0.635=1.2. Thus, sulfolane exhibits good separating efficiency for separating 113 and 132*b* by liquid-liquid extraction.

The commercial extractor is designed using the separation factor calculated as above. The extractor requires about 50 separation stages depending on purity of the desired products. Each stage consists of about two perforated trays or perhaps 3 or perhaps 3 or 4 feet of packing such as Raschig rings. Sulfolane solvent is fed to the top of the extractor and the mixture of 113 and 132*b* to the middle. The overhead consists essentially of high-purity 113 with a little sulfolane which can be removed by water washing. The solvent-rich phase exits the bottom of the extractor and consists of sulfolane containing dissolved 132*b*. This mixture is separated by conventional fractionation to recover sulfolane for recycle and 132*b*. Part of the 132*b* is recovered as product and the remainder returned to the bottom of the extractor as reflux.

It is desirable to mix small amounts of water with the sulfolane if an extremely high-purity 132*b* product is required. This is because pure 132*b* and sulfolane are completely miscible at room temperature. With sulfolane containing 5 weight percent water, however, two liquid phases are obtained. Thus, water-free sulfolane is preferred if the purity of 132*b* need not be above about 75 percent. Higher purities require the addition of water, from 2 to 10 weight percent.

The ratio of sulfolane solvent passed to the top of the extractor to the 113-132*b* mixture passed to the center of the extractor varies depending on the purities of products desired and the ratio of 113 to 132*b* in the feed mixture. The ratio will generally be about 10 volumes of sulfolane per volume of 113-132*b* feed mixture but may vary from about 5 to about 20.

The sulfolane of this invention may be employed as selective solvents by themselves singularly or as mixtures of two or more, such as aqueous solutions or together with auxiliary selective solvents or anti-solvents, provided the additives to the sulfolanes do not react with it and are stable under the temperature conditions of the process.

Some suitable specific sulfolanes are as follows: sulfolane, hydrocarbon-substituted sulfolanes such as alkyl sulfolanes preferably containing not more than about 14 carbon atoms; hydroxy sulfolanes such as 3-sulfolanol, 2-sulfolanol, 3-methyl-4-sulfolanol, 3,4-sulfolanediol, etc.; sulfolanyl ethers such as methyl-3-, propyl-3-, allyl-3-, butyl-3-, crotyl-3-, isobutyl-3-, etc.; methallyl-3-, methyl vinyl carbinyl-3-, amyl-3, hexyl-3-, octyl-3-, nonyl-3-, glycerol alpha-gamma-diallyl-beta-3-, tetrahydrofurfuryl-3-, 3,3,5-tetramethylcyclohexyl-3-, m-cresyl-3-sulfolanyl ethers, corresponding 2-sulfolanyl ethers; disulfolanyl ethers, etc.; sulfolanyl esters such as 3-sulfolanyl acetate, 3-sulfolanyl propionate, -butyrate, -caproate, etc.; N-sulfolanes such as 3 - sulfolanylamine, N-methyl, N-ethyl, N,N-dimethyl, N-allyl, N-butyl, N-octyl - 3 - sulfolanylamines, etc.; sulfolanyl sulfides such as ethyl-3-, tertiary butyl-3-, isobutyl-3-, methallyl - 3 - sulfolanyl sulfides, di-3-sulfolanyl sulfide, etc.; sulfolanyl sulfones such as methyl-3-, ethyl-3-, propyl-3-, amyl - 3 - sulfolanyl sulfones; sulfolanyl halides such as 3-chloro-, 3,4-dichloro-, 3-chloro-4-methyl sulfolanes, etc.; and mixed sulfolanes such as 4-chloro - 3 - sulfolanol, 4-chloro - 3 - sulfolanol acetate, 3-sulfolanyl amine hydrochloride, N(3-sulfolanyl)acetamide, etc.

The extraction is carried out at a temperature at which the solvent is liquid and stable.

Of the sulfolanes useful in this invention, some are more heat-stable than others; thus, in particular, the halogen, amine, acid, some aldehyde, and some ester derivatives are relatively heat-unstable. Some may begin to decompose at temperatures as low as 150° C. Other sulfolanes, on the other hand, are extremely heat-stable even at temperatures as high as 300° C.

Other modifications and alterations of this invention will become apparent to those skilled in the art from the foregoing discussion and examples and it should be understood that this invention is not to be unduly limited thereto.

What is claimed is:

1. A solvent extraction process for the separation of 1,1,2 - trichlorotrifluoroethane from a first liquid mixture of 1,1,2 - trichlorotrifluoroethane and 1,2 - dichloro-1,1-difluoroethane, comprising:

contacting said first liquid mixture with sulfolane at a contacting temperature at which sulfolane is liquid and stable thereby forming an extract phase and a raffinate phase; and
separating said phases.

2. A solvent extraction process for the separation of 1,1,2 - trichlorotrifluoroethane from a first liquid mixture of 1,1,2 - trichlorotrifluoroethane and 1,2 - dichloro-1,1-difluoroethane, comprising:

contacting said first liquid mixture with a compound or mixtures of compounds chosen from the group consisting of sulfolane, alkyl sulfolanes containing not more than 14 carbon atoms; 3-sulfolanol, 2-sulfolanol, 3-methyl - 4 - sulfolanol, 3,4-sulfolanediol; methyl-3-, propyl-3-, allyl-3-, butyl-3-, crotyl-3-, isobutyl-3-, methallyl-3-, methyl vinyl carbinyl-3-, amyl-3-, hexyl-3-, octyl-3-, nonyl-3-, glycerol alpha-gamma-diallyl-beta-3-, tetrahydrofurfuryl-3-, 3,3,5-tetramethylcyclohexyl-3- and m-cresyl - 3 - sulfolanyl ethers; methyl-2-, propyl-2-, allyl-2-, butyl-2-, crotyl-2-, isobutyl-2-, methallyl-2-, methyl vinyl carbinyl-2-, amyl-2-, hexyl-2-, octyl-2-, nonyl-2-, glycerol alpha-gamma-diallyl-beta-2-, tetrahydrofurfuryl-2-, 3,3,5-tetramethylcyclohexyl-2- and m-cresyl - 2 - sulfolanyl ethers; 3-sulfolanyl acetate, 3-sulfolanyl propionate, 3 - sulfolanyl butyrate, 3 - sulfolanyl caproate; 3-sulfolanylamine, N-methyl - 3 - sulfolanylamine, N-ethyl - 3 - sulfolanylamine, N,N-dimethyl-3-sulfolanylamine, N-allyl - 3 - sulfolanylamine, N-butyl-3-sulfolanylamine, N-octyl - 3 - sulfolanylamine; ethyl-3-sulfolanyl sulfide, tertiary butyl - 3 - sulfolanyl sulfide, isobutyl - 3 -sulfolanyl sulfide, methallyl-3-sulfolanyl sulfide, di - 3 - sulfolanyl sulfide; methyl-3-sulfolanyl sulfone, ethyl-3-sulfolanyl sulfone, propyl-3-sulfolanyl sulfone, amyl-3-sulfolanyl sulfone; 3-chloro-sulfolane, 3,4-dichloro-sulfolane, 3-chloro-4 - methyl - sulfolane; 4 - chloro - 3 - sulfolanol, 4-chloro - 3 - sulfolanol acetate, 3-sulfolanyl amine hydrochloride, and N(3-sulfolanyl)acetamide; at a temperature at which said compound or mixture of compounds is liquid and stable thereby forming an extract phase and a raffiniate phase; and
separating said phases.

References Cited
UNITED STATES PATENTS 3,624,166   11/1971   Fuhrmann et al. ----- 260—653

LEON ZITVER, Primary Examiner

J. A. BOSKA, Assistant Examiner